No. 740,036. PATENTED SEPT. 29, 1903.
J. B. OELKERS.
PROCESS OF MANUFACTURING FERRULES OR THE LIKE.
APPLICATION FILED JAN. 5, 1903.
NO MODEL.

WITNESSES:
Geo W Eisenhauer
Raena N. Judd

INVENTOR:
John B. Oelkers,
BY
A Faber du Faur
ATTORNEY.

No. 740,036.

Patented September 29, 1903.

UNITED STATES PATENT OFFICE.

JOHN B. OELKERS, OF NEWARK, NEW JERSEY.

PROCESS OF MANUFACTURING FERRULES OR THE LIKE.

SPECIFICATION forming part of Letters Patent No. 740,036, dated September 29, 1903.

Application filed January 5, 1903. Serial No. 137,919. (No model.)

*To all whom it may concern:*

Be it known that I, JOHN B. OELKERS, a citizen of the United States of America, residing at Newark, in the county of Essex and State of New Jersey, have invented certain new and useful Improvements in Processes for Manufacturing Ferrules or the Like, of which the following is a specification.

My invention has reference to improvements in processes for manufacturing ferrules of plastic material—such as rubber, celluloid, and the like—and has for its objects, first, to produce a ferrule having substantially uniform strength—that is to say, a ferrule not liable to split along a line in the direction of its length—and, secondly, to produce such ferrule in the most expeditious manner.

Heretofore ferrules have been produced from a tubular body which was compressed transversely into the required shape; but it is obvious that such transverse compression left a plane of weakness about the axis of the tubular body in view of the fact that the dies formed an extreme pressure at the top with a gradual diminution to practically no pressure at ninety degrees. In consequence thereof the ferrule was subjected to rupture along diametrically opposite lines extending lengthwise of the ferrule. This fact has been substantiated in practice, as ferrules for shaving-brushes frequently split longitudinally in view of the pressure exerted by the spreading or swelling of the hairs when the brush is used, owing to the propagation beyond the externally-extending bristles of the moisture absorbed by the bristles.

My invention therefore consists in a process for forming ferrules or other like tubular bodies from tubular sections by compressing the same longitudinally—that is to say, in the direction of their central axes—and also forming thereon simultaneously with said compression an internal screw-thread at one end.

The nature of my invention will best be understood when described in connection with the accompanying drawings, in which—

Figure 1:
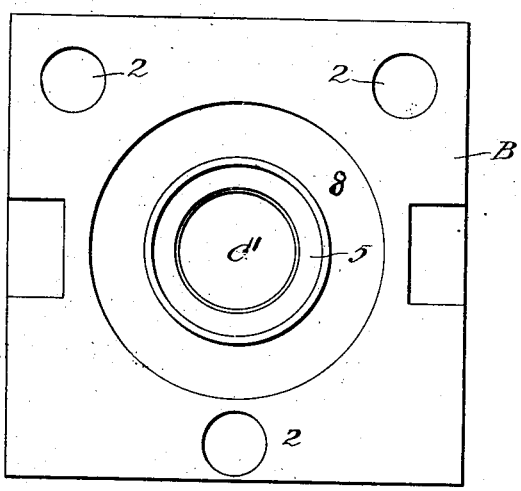
Figure 2:
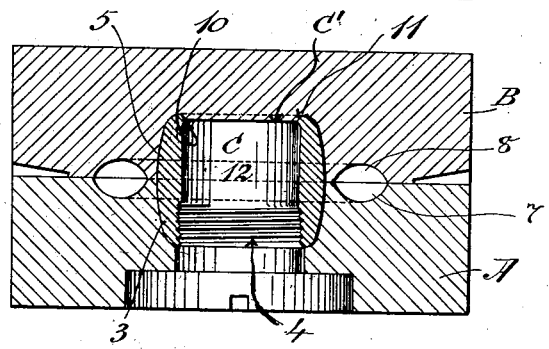
Figure 3:
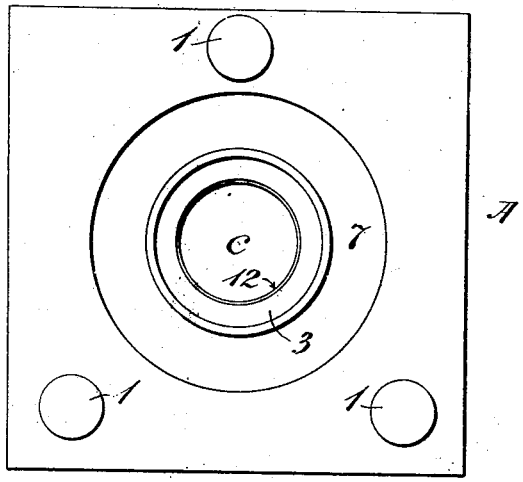
Figure 4:
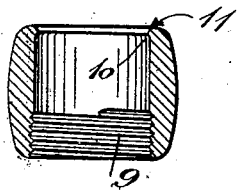

Figure 1 represents a face view of the upper member of a die or mold employed in carrying out my process. Fig. 2 is a transverse section through the die or mold, showing the members brought together and the ferrule molded or formed. Fig. 3 is a face view of the lower member of the die or mold. Fig. 4 is a transverse section through a ferrule formed according to my process.

Similar letters and numerals of reference designate corresponding parts throughout the several views of the drawings.

Referring to the drawings, the letters A and B designate, respectively, the two members of the die or mold, which are provided with usual means—such, for instance, as the pins 1 and sockets 2—for the purpose of guiding and registering the same. The lower member A is provided with a depression 3, in this instance made circular, although it may be made polygonal. Within this depression 3 is arranged a rigid boss C, which projects above or beyond the plane of the inner surface of said lower member of the die or mold and is provided within said depression with a screw-thread 4. In practice I prefer to make this boss separate from the lower member of the die or mold and to set the same into said lower member from the bottom thereof. The upper member of the die or mold is provided with a recess 5, registering with the depression 3 of the lower member, and also with a boss C', registering with the boss C of the lower member. The boss C' extends but slightly beyond the bottom of the depression 5 and is flared outwardly and upwardly to give it the form of a truncated cone. The heights of the two bosses are such that their adjacent ends or surfaces meet when the die or mold is fully closed. Each member of the die or mold is also preferably provided with an overflow-groove 7 8, adapted to receive the surplus material in a usual manner. The inner or upper edge 12 of the boss C is chamfered. The die or mold may be placed into any ordinary press adapted to operate the upper die or mold in a usual manner.

It will readily be understood that if a tubular section of rubber, celluloid, or like material capable of being molded under the influence of pressure or combined heat and pressure is placed within the depression 3 of the lower member of the die or mold and the upper member is caused to descend the section will be caused, first, to be provided with an internal screw-thread 9 at its lower end corresponding to the screw-thread on the boss C; secondly, with an interior flange 10, and, thirdly, with an upwardly and outwardly flaring opening or mouth 11. Furthermore, in consequence of the ferrule being formed by compression in the direction of its longitudinal axis it possesses substantially uniform strength in diametrical planes and offers no weak lines to the pressure exerted by the spreading or swelling of the hairs or bristles when the latter are moistened.

It is evident that the screw-thread on the lower boss C may be replaced by another formation for the purpose of establishing means at the end of the ferrule for its attachment to a handle. Therefore I do not wish to restrict myself to the formation of a screw-thread on the ferrule nor to any particular construction of the hair-retaining end of said ferrule, as the essential feature of my invention consists in the process of manufacturing a ferrule compressed longitudinally in its formation and has no particular reference to the means employed or to the article produced, which I have illustrated and claimed in my prior patent, No. 717,604, dated January 6, 1903, and in my pending application, Serial No. 118,424, dated August 5, 1902.

What I claim as new is—

1. The herein-described process for forming ferrules or like tubular bodies from tubular sections consisting in compressing said sections in their longitudinal directions while shaping the same.

2. The herein-described process for forming ferrules or like tubular bodies from tubular sections consisting in compressing said sections in their longitudinal directions while shaping the same and simultaneously providing the section at one end with an attaching-thread and at the other end with a retaining means.

In testimony whereof I have hereunto set my hand in the presence of two subscribing witnesses.

JOHN B. OELKERS.

Witnesses:
A. FABER DU FAUR, Jr.,
L. MANGOLD.